Oct. 18, 1932.  T. VAN TUYL  1,883,847
LIQUID FEEDING DEVICE
Filed Nov. 10, 1928
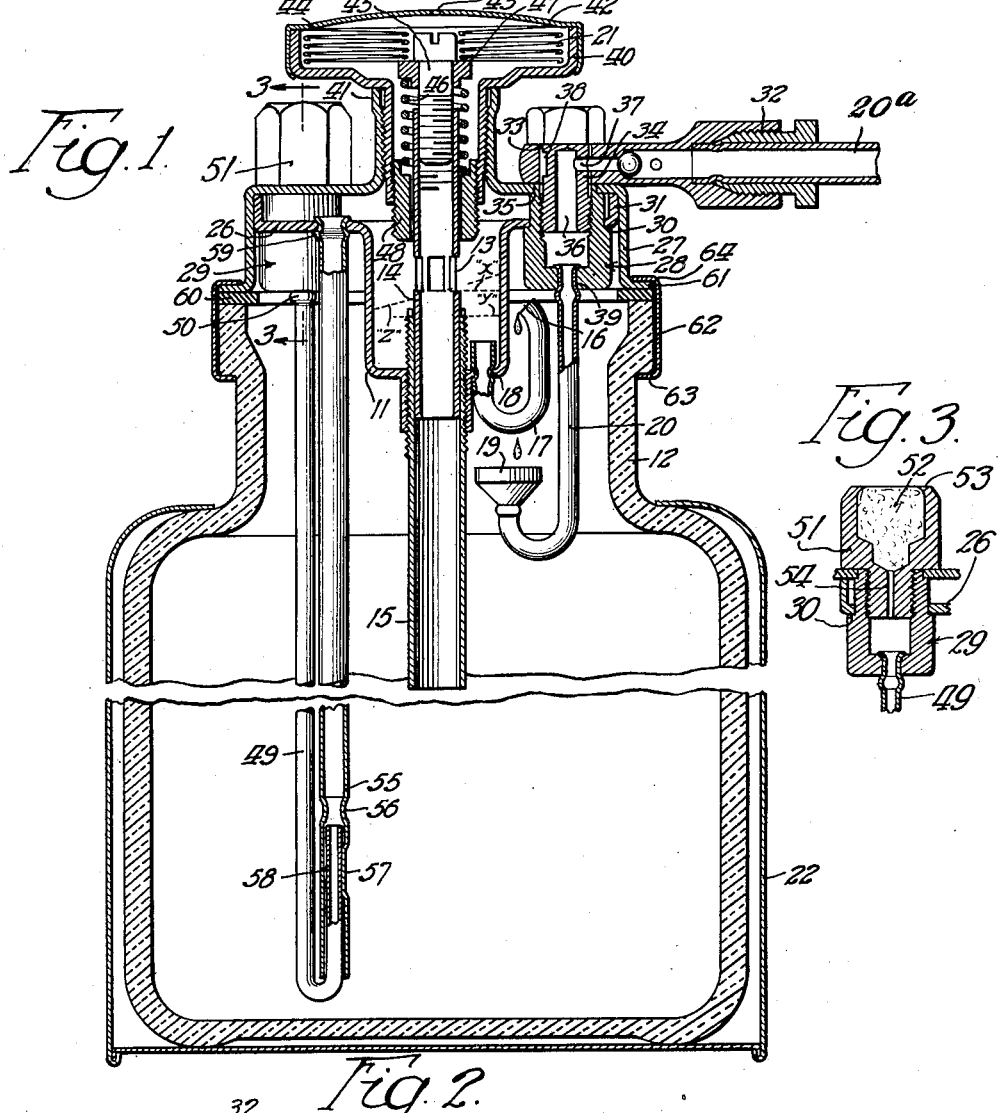
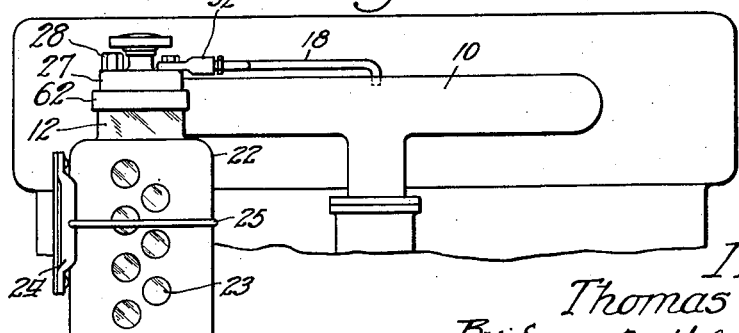
Inventor
Thomas Van Tuyl
By Emery, Booth, Janney & Varney
Attys.

Patented Oct. 18, 1932

1,883,847

UNITED STATES PATENT OFFICE

THOMAS VAN TUYL, OF OAK PARK, ILLINOIS, ASSIGNOR TO JAY MANUFACTURING COMPANY, A CORPORATION OF ILLINOIS

LIQUID FEEDING DEVICE

Application filed November 10, 1928. Serial No. 318,418.

This invention relates to liquid feeding devices and aims to provide a device for reliably supplying liquids in regular but minute quantities.

The nature of the invention may be readily understood by reference to one construction, a device for supplying lubricant, embodying the invention and shown in the accompanying drawing.

In said drawing:

Fig. 1 is a sectional elevation of a lubricant supply device.

Fig. 2 is a diagrammatic view showing the device applied to an internal combustion engine.

Fig. 3 is a vertical section of the air entrance orifice taken on the line 3—3 of Fig. 1, this detail being shown in elevation in Fig. 1 lying as it does back of the plane of the sections.

In the illustrative device the supply of lubricant in minute quantities is effected by employing a controlled low pressure or hydraulic head. While excess of lubricant is not objectionable in many instances, it is objectionable in lubricating the valves, valve stems and upper portions of cylinder walls of an internal combustion engine for well known reasons. It is, therefore, advantageous that the instrumentality for supplying lubricant to the valves, et cetera, function to supply only the necessary amount and no more. The present device is designed to introduce the lubricant into the engine intake (in this case at the intake manifold 10) whence it is carried into the combustion chamber and there lubricates the valve stems and the upper portion of the cylinder walls.

The active supply of lubricant is contained in a reservoir 11 in this instance formed as a cup at the upper portion of a receptacle 12 which advantageously contains a bulk supply of lubricant. The level "$x$" of the lubricant in the reservoir is determined by an overflow in the form of a series of openings 13 in a tube 14 which permit lubricant at a level above that determined by the lower edges of such openings to escape and pass through tube 15 into receptacle 12. Tube 15 is in this instance screwed into a flanged opening in the bottom of the reservoir. The reservoir outlet orifice is located at the elevation "$y$" just a short distance below the overflow level "$x$". In this instance the outlet orifice 16 occurs at the extremity of a U-tube 17 entering the bottom of the reservoir and beaded therein at 18 to form a tight joint. The outlet extremity of the tube is positioned so that the outlet orifice lies in an inclined plane (see Fig. 1), thereby preventing the surface tension of the oil issuing from the orifice from disturbing the effective hydraulic head which causes the oil to flow. For example, if the edges of the orifice 16 lay in a horizontal plane, the surface tension in the oil would permit the formation of a drop of oil at a substantial height above the orifice, thereby substantially reducing, if not wholly counteracting the hydraulic head determined by the distance between the oil level "$x$" and the elevation "$y$" of the outlet orifice. In the present construction even if a substantial drop of oil could form at the outlet orifice 16, it would not materially reduce the hydraulic head; but as a matter of fact the action of gravity on the oil issuing from the tube prevents the formation of any substantial drop, the oil seeping down the tube in a film or falling in small drops from the orifice.

It is apparent from the foregoing that the employment of a low hydraulic head (the distance between the elevations "$x$" and "$y$") results in a very slow but regular feed of oil and this result is accomplished without the restriction of any oil passage. The flow of oil is, therefore, independent of the presence of minute solid particles which would effectively clog a throttled orifice (such as a needle valve) employed to secure a very slow oil feed under a relatively large hydraulic head. With the use of a very low, controlled hydraulic head even a throttled opening (effected by a needle valve or the like) might be employed because the valve opening would not need to be so small as where the oil were under a relatively high pressure and, therefore, the danger of stopping the oil flow by the collection of small particles at the needle would be practically eliminated.

The oil issuing from the outlet orifice 16 is conducted to the intake manifold by means of a small tube 20a which (under the suction of the intake manifold) conducts the oil as fast as it is released and delivers it to the combustion chamber in a form in which it is effective as a lubricant, that is, in small drops instead of as a vapor. This may be understood by contrasting it with the condition of oil supplied by introducing it into the gasoline where its body is seriously affected by the gasoline and it is delivered to the combustion chamber (like the gasoline) in a vapor, in which form it is both partially burned and carbonized by the explosion before it can deposit in an adequately thick film on the surfaces requiring lubrication. In the present case the oil issuing from the orifice 16 is collected in a small cup or funnel 19 located below the orifice and forming the inlet opening of the tube 20 connected with tube 18.

The quantity of lubricant supplied is advantageously automatically varied in accordance with the engine demands. That is, under greater loads where there is a greater need for lubricant, a greater quantity is supplied. This variation is effected by raising the level "$x$" of the oil in the reservoir in an inverse ratio to the manifold suction. Such inverse ratio approximately represents the variation in the engine demand for lubricant. That is, with increase in load, the vacuum in the intake manifold reduces, and vice versa. For this purpose, the tube 14 is controlled by a pressure responsive device in the form of a bellows or sylphon diaphragm 21 whose interior is open to the atmosphere and whose exterior (located in a closed housing) is brought under the influence of the engine suction.

The foregoing described instrumentalities are associated in a unitary device whose structural features will be described. The bulk oil receptacle 12 is advantageously a glass jar carried within a metal jacket 22 having sight openings 23 therein. The jar is supported in an appropriate place by a bracket 24 having a clamping ring 25 which surrounds and supports the device. The reservoir 11, which is of pressed metal, is provided with a horizontal flange 26 whose diameter substantially corresponds with that of the interior of the cover 27 of the device. It is supported within the cover by the connection fittings 28 and 29 which pass through openings in flange 26 and carry the latter on shoulders 30. The vertical annular flange 31 on the reservoir serves to space the flange 26 from the top of the cover.

Tube 18 is connected with the device by a compression coupling 32 whose end is provided with a transverse opening 33 through which passes a threaded stud 34 screwed into fitting 28, thus not only connecting the tube 18 with the interior of the device but connecting the fitting 28 with the cover which seats against the shouldered extremity 35 of the fitting. The stud 34 has a central passage 36 leading to radial holes 37 connecting the former with the annular passage 38 which is in communication with the bore of the compression coupling 32. The tube 20 is beaded at 39 into an opening in the bottom of the fitting 28.

The diaphragm 21 is carried in a cup-like housing 40 made of pressed metal and which in this instance is screwed into the integral sleeve 41 on the cover 27. The diaphragm housing is closed by a cap 42 having an opening 43 therein so that the interior of the diaphragm may be open to the atmosphere. The top section 44 of the diaphragm is held between the top of the housing 40 and the cap 42 so as to seal the interior of the device against entrance of air.

The tube 14 is connected with the diaphragm by means of an adjusting screw 45 passing through the connecting hole in the diaphragm and entering the upper portion of the tube. Thus the tube 14 may be raised and lowered relative to the diaphragm by turning the screw. The spring 46 which surrounds the upper portion of the tube presses at its upper end against the diaphragm through the annular spring seat member 47 and at its lower end against an annular adjusting nut 48 screwed into the sleeve of the diaphragm housing. The spring serves yieldingly to resist expansion of the diaphragm, and the nut 48 permits an adjustment of the spring tension.

The diaphragm is provided with openings in its upper portion which communicate with the atmosphere through the opening 43 in the cap; but the exterior of the diaphragm below its top is in communication with the manifold vacuum through the interior of the device. Thus an increase in vacuum communicated through the tube 18 causes the diaphragm to expand and lower the level "$x$". This results in a reduction in the rate of oil feed. By proper manipulation of the screw 45 in conjunction with the spring tension, both the position of the level "$x$" and the degree of variation thereof under a given variation in vacuum may be adjusted. In this connection it should be noted that the upper edge of the tube 15 may be located so as to place a limit on the reduction in the oil level "$x$", thereby preventing the extreme lowering of the openings 13 from carrying the oil level down to a point where no oil will issue from the orifice 16; or in the absence of automatic regulation by tube 14, its upper edge may be adjusted to determine the oil level. The upper end of tube 15 is notched (see Fig. 1) to receive a screw driver or the like inserted from above through sleeve 41 by means of which it may be rotated to adjust the level.

The reservoir 11 is advantageously supplied with oil by a venturi or inspirator device associated with the U-tube 49 the ends of which communicate respectively with the outside atmosphere and the reservoir 11. In this instance the entrance end 50 of the tube is beaded into the bottom of the fitting 29 which is clamped in place, similarly to fitting 30, by means of the stud 51 passing through the top cover and screwed into the interior of the fitting. Stud 51 is provided with a hollow interior to receive an air filtering medium such as a felt plug 52 held therein by the beaded over edges 53 of the stud. The hollow interior communicates with the tube 49 through a restricted air passage 54 which may be about one sixty-fourth of an inch in diameter. The tube 49 extends approximately to the bottom of the receptacle 12 and its upwardly turned end enters a somewhat larger tube 55 formed with a Venturi throat 56 just above the extremity of the tube 49. The tube 55 is indented as at 57 at spaced points around its circumference to center the extremity of tube 49 therein and to leave passages 58 to permit oil entering the bottom of tube 55 to travel upwardly therein. The upper end of tube 55 is beaded at 59 in an opening in flange 26 of the reservoir. Since the upper extremity of tube 55 is in communication with the interior of the receptacle it in turn is subjected to the vacuum of the intake manifold whereby air is drawn through the filtering pad 53 into tube 49. As the air expands after its passage beyond the Venturi throat 56, it produces a suction sufficient to raise oil through tube 55 into the reservoir 11. Excess oil returns through openings 13 to the oil supply in receptacle 12. While the amount of air entering tube 49 and the suction created by the venturi device are both small, they are adequate to maintain the level "x" in the reservoir. The amount of oil necessary for an ordinary automobile engine is about one quart for two thousand miles of travel and it is apparent, therefore, that the rate of feed and expenditure of oil is very small. While the inspirator is designed to deliver a slight excess of oil to the reservoir under all conditions of vacuum, there is very little variation in rate of delivery under varying vacuum conditions. One explanation of this result is that while the vacuum induced in the Venturi throat increases with increased engine suction, so also does the vacuum on the oil in the supply receptacle,—hence the difference in pressure which forces oil up the tube 55 does not greatly vary.

The cup 19 is of a size sufficiently large to hold several drops of oil which, on starting of the engine, are at once drawn into the combustion chamber. This supplies the valves with a slug of oil necessary to replace the oil which may be dried or drained from the valve stems and upper cylinder walls while the engine remained idle.

In automobile engines, the device is located so that the orifice 16 is at the back, thus in climbing a hill the oil level "x" will be shifted to a position indicated approximately by the dotted line "z", resulting practically in an increase in oil elevation relative to orifice 16 and in increase in oil feed when the engine is laboring during the hill-climb.

A gasket 60 serves to seal the joint between the upper edge of the receptacle 12 and the laterally extending flange 61 on the cover. The cover is held in place by a ring 62 whose flanges 63 and 64 pass respectively under the shoulder of the receptacle opening and over the flange 61. The ring 62 is an integral ring and is initially formed with the lower portion thereof bent into the form indicated in dotted lines in Fig. 1. After association with the receptacle and cover, a die or appropriate tool is passed over the ring and the dotted line portions are bent into engagement with the receptacle as shown.

Obviously the invention is not limited to the details of the illustrative device since these may be variously modified. Moreover, it is not indispensable that all features of the invention be used conjointly since various features may be advantageously used in different combinations and sub-combinations.

Having described one embodiment of my invention, I claim:

1. A device for supplying lubricant to the intake of an internal combustion engine comprising in combination an oil reservoir, a conduit leading from said reservoir to the intake manifold of the engine whereby lubricant may be introduced into the combustion space, feeding means having a free lubricant passage for delivering lubricant from the reservoir to said conduit, and mechanism for controlling said feeding means for varying the supply of lubricant to said conduit responsive to engine demands.

2. A device for supplying lubricant to the intake of an internal combustion engine comprising in combination an oil reservoir, a conduit leading from said reservoir to the intake manifold of the engine whereby lubricant may be introduced into the combustion space, means for maintaining a relatively low hydraulic head of oil in said reservoir independently of the variation of the oil contents of said device, and a member having a free passage for delivering oil to said conduit, said means being adjusted to maintain a head of oil so low as to permit the use of said unrestricted passage for conducting minute quantities of oil.

3. A device for automatically supplying small quantities of liquid comprising in combination a liquid supply, a receptacle for receiving liquid from said supply to maintain a liquid level, said receptacle having an orifice only slightly below the liquid level so as to provide only a very low hydraulic head to insure a very slow flow of liquid from said orifice, said orifice being inclined to prevent the surface tension of the liquid from counteracting the hydraulic head in said receptacle and means for conducting away the liquid as it issues from said orifice.

4. A device for automatically supplying small quantities of liquid comprising in combination a liquid supply, a liquid receptacle arranged to provide a liquid level, a device for conducting liquid from said supply to said receptacle, said receptacle having an orifice only slightly below the liquid level so as to provide only a very low hydraulic head to insure a very slow flow of liquid from said orifice, said orifice being inclined to prevent the surface tension of the liquid from counteracting the hydraulic head in said receptacle and means for conducting away the liquid as it issues from said orifice.

5. A device for automatically supplying small quantities of lubricant to an internal combustion engine, comprising in combination, a lubricant supply receptacle, an oil reservoir associated with said receptacle to provide an oil level independent of the contents of said receptacle, a suction conduit connecting said device with the intake manifold of the engine whereby lubricant may be introduced into the engine combustion space, said reservoir being provided with an orifice only slightly below the liquid level so as to provide only a very low hydraulic head to effect a very slow flow of liquid from said orifice, and means associated with said conduit for receiving the liquid as it issues from said orifice.

6. A device for automatically supplying small quantities of lubricant to an internal combustion engine, comprising in combination, a lubricant supply receptacle, an oil reservoir associated with said receptacle to provide an oil level independent of the contents of said receptacle, a suction conduit connecting said device with the intake manifold of the engine whereby lubricant may be introduced into the engine combustion space, said reservoir being provided with an orifice only slightly below the liquid level so as to provide only a very low hydraulic head to effect a very slow flow of liquid from said orifice, said orifice being inclined relative to the liquid level in said reservoir to prevent the surface tension of the liquid from counteracting the hydraulic head in said reservoir, and means associated with said conduit for receiving the liquid as it issues from said orifice.

7. A lubricating device for internal combustion engines comprising in combination, a lubricant receptacle, a suction conduit connecting the receptacle with the engine intake for conducting lubricant to the engine combustion space, means for holding a quantity of lubricant at a point above the lubricant level in said receptacle, means actuated by the suction communicated to said receptacle by said conduit for elevating lubricant from said receptacle to said holding means, means for delivering lubricant from said holding means to said conduit, and means for limiting the rate of feed of lubricant to said conduit.

8. A lubricating device for internal combustion engines comprising in combination, a lubricant receptacle, a suction conduit connecting the receptacle with the engine intake for conducting lubricant to the engine combustion space, a reservoir at the upper portion of said receptacle for holding a quantity of lubricant above the level of that held by the receptacle, a conduit in said receptacle and open to the suction therein for conducting air from the exterior of said receptacle to the lower portion of said receptacle and thence discharging into said reservoir, said conduit having communication at its lower portion with the lubricant supply in said receptacle to permit the entry of lubricant therein to be elevated to said reservoir by the air current passing through said conduit, and means for delivering lubricant from said reservoir to said suction conduit.

9. A lubricating device for internal combustion engines comprising in combination, a lubricant receptacle, a suction conduit connecting the receptacle with the engine intake for conducting lubricant to the engine combustion space, a reservoir at the upper portion of said receptacle for holding a quantity of lubricant above the level of that held by the receptacle, a conduit in said receptacle and open to the suction therein for conducting air from the exterior of said receptacle to the lower portion of said receptacle and thence discharging into said reservoir, said conduit having communication at its lower portion with the lubricant supply in said receptacle to permit the entry of lubricant therein to be elevated to said reservoir by the air current passing through said conduit, and means for delivering lubricant from said reservoir to said suction conduit, said reservoir being provided with an outlet leading back into said receptacle.

10. A lubricating device for internal combustion engines comprising in combination, a lubricant receptacle, a suction conduit connecting the receptacle with the engine intake for conducting lubricant to the engine combustion space, a reservoir at the upper portion of said receptacle for holding a quantity of lubricant above the level of that held by the receptacle, a conduit in said receptacle and open to the suction therein for conducting air from the exterior of said receptacle to the lower portion of said receptacle and thence discharging into said reservoir, said conduit having communication at its lower portion with the lubricant supply in said receptacle to permit the entry of lubricant therein to be elevated to said reservoir by the air current passing through said conduit, and means for delivering lubricant from said reservoir to said suction conduit, said reservoir being provided with an outlet above the bottom of said receptacle and leading back into said receptacle whereby a quantity of oil may be held in said reservoir but the lubricant above said outlet may return from time to time to said receptacle.

11. A lubricating device for internal combustion engines comprising in combination, a lubricant receptacle, a suction conduit connecting the receptacle with the engine intake for conducting lubricant to the engine combustion space, a reservoir at the upper portion of said receptacle for holding a quantity of lubricant above the level of that held by the receptacle, a conduit in said receptacle having its outer end communicating with the atmosphere and its other end with the suction in said receptacle, said conduit leading down into the body of lubricant in said receptacle and then up and discharging into said reservoir and having an opening in its lower portion to admit lubricant, whereby lubricant is elevated by the suction-induced current of air therein and discharged into said reservoir, said conduit also being open to and adjacent said suction conduit whereby said current of air is drawn into said suction conduit, said reservoir being constructed and arranged to deliver lubricant to said suction conduit to be carried with said current of air into the engine.

12. A lubricating device for internal combustion engines comprising in combination, a lubricant receptacle, a suction conduit connecting the receptacle with the engine intake for conducting lubricant to the engine combustion space, a reservoir at the upper portion of said receptacle for holding a quantity of lubricant above the level of that held by the receptacle, a conduit in said receptacle having its outer end communicating with the atmosphere and its other end with the suction in said receptacle, said conduit leading down into the body of lubricant in said receptacle and then up and discharging into said reservoir and having an opening in its lower portion to admit lubricant, whereby lubricant is elevated by the suction-induced current of air therein and discharged into said reservoir, said conduit also being open to and adjacent said suction conduit whereby said current of air is drawn into said suction conduit, said reservoir being constructed and arranged to deliver lubricant to said suction conduit to be carried with said current of air into the engine, and means responsive to variation in engine suction for regulating the quantity of lubricant delivered through said suction conduit to the engine.

13. A lubricating device for internal combustion engines comprising in combination, a lubricant receptacle, a covering structure therefor having an air inlet and a suction outlet, the latter adapted to be connected with the engine suction, U-tube carried by said structure and communicating at its respective ends with said inlet and outlet and arranged to extend into the lubricant, said U-tube provided with an oil entrance therein below normal oil levels whereby oil will be carried with the current of air in said tube created by the suction, said structure being provided with a reservoir arranged to receive the discharge of lubricant from said tube, and means associated with said reservoir for delivering lubricant into the current of air passing out of said suction outlet.

14. A lubricating device for internal combustion engines comprising in combination, a lubricant receptacle, a covering structure therefor having an air inlet and a suction outlet, the latter adapted to be connected with the engine suction, a U-tube carried by said structure and communicating at its respective ends with said inlet and outlet and arranged to extend into the lubricant, said U-tube provided with an oil entrance therein below normal oil levels whereby oil will be carried with the current of air in said tube created by the suction, said structure being provided with a reservoir arranged to receive the discharge of lubricant from said tube, said reservoir being provided with an overflow for returning excess lubricant to the body of lubricant in said receptacle, and means associated with said reservoir for delivering lubricant into the current of air passing out of said suction outlet.

15. A lubricating device for internal combustion engines comprising in combination, a lubricant receptacle, a covering structure therefor having an air inlet and a suction outlet, the latter adapted to be connected with the engine suction, a U-tube carried by said structure and communicating at its respective ends with said inlet and outlet and arranged to extend into the lubricant, said U-tube provided with an oil entrance therein below normal oil levels whereby oil will be carried with the current of air in said tube created by the suction, said structure being provided with a reservoir arranged to receive the discharge of lubricant from said tube, and a removable closure above said reservoir.

16. A lubricating device for internal combustion engines comprising in combination, a lubricant receptacle, a covering structure therefor having an air inlet and a suction outlet, the latter adapted to be connected with the engine suction, a U-tube carried by said structure and communicating at its respective ends with said inlet and outlet and arranged to extend into the lubricant, a hollow screw plug connected with the inlet end of said tube and having therein a body of fibrous air filtering material, said U-tube provided with an oil entrance therein below normal oil levels whereby oil will be carried with the current of air in said tube created by the suction, said structure being provided with a reservoir arranged to receive the discharge of lubricant from said tube, and means associated with said reservoir for delivering lubricant into the current of air passing out of said suction inlet.

17. A lubricating device for internal combustion engines comprising in combination, a lubricant receptacle, a covering structure therefor having an air inlet and a suction outlet, the latter adapted to be connected with the engine suction, a U-tube carried by said structure and communicating at its respective ends with said inlet and outlet and arranged to extend into the lubricant, said U-tube provided with an oil entrance therein below normal oil levels whereby oil will be carried with the current of air in said tube created by the suction, said structure being provided with a reservoir arranged to receive the discharge of lubricant from said tube, means associated with said reservoir for delivering lubricant into the current of air passing out of said suction outlet, and a sealing gasket between said cover structure and said receptacle for sealing said receptacle except for said inlet and outlet.

18. A device of the character described for delivering liquid in small quantities comprising in combination a liquid reservoir, a delivery conduit leading to said reservoir, an outlet from said reservoir for delivering liquid to said conduit, and means for controlling the flow of liquid from said reservoir by pressure variation.

19. A device of the character described for delivering liquid in small quantities comprising in combintion a liquid reservoir, a delivery conduit leading to said reservoir, an outlet from said reservoir for delivering liquid to said conduit, and means for maintaining the liquid level in said reservoir at a level slightly above said outlet to control the rate of delivery of liquid to said conduit.

20. A device for supplying minute quantities of lubricant comprising in combination a lubricant reservoir having a delivery outlet from which lubricant may flow by gravity, a delivery conduit for receiving the lubricant leaving said outlet, a lubricant supply receptacle below said reservoir, means for elevating lubricant from said receptacle to said reservoir, and a conduit for returning excess lubricant to said receptacle.

21. A device for supplying minute quantities of lubricant comprising in combination a lubricant reservoir having a delivery outlet, a delivery conduit having a free passage throughout for conducting the lubricant from said outlet to the point of use, a lubricant supply receptacle below said reservoir, means for elevating lubricant from said receptacle to said reservoir, and pressure variable means for varying the effective liquid pressure to control the rate of flow of lubricant from said reservoir.

22. A device for supplying minute quantities of lubricant comprising in combination a lubricant reservoir having a delivery outlet, an unrestricted delivery conduit for conducting the lubricant from said outlet to the point of use, a lubricant supply receptacle below said reservoir, means for elevating lubricant from said receptacle to said reservoir, and means for maintaining the level of lubricant in said reservoir slightly above level of said outlet to control the rate of flow from said outlet.

23. A device for supplying minute quantities of lubricant comprising in combination, an enclosed lubricant receptacle, a lubricant reservoir within the enclosure of said receptacle and located at a higher level than that of the lubricant in said receptacle, a suction conduit connected with said enclosure and communicating freely with said receptacle and said reservoir, means for elevating lubricant from said receptacle to said reservoir, and a delivery outlet in said reservoir for delivering lubricant to said suction conduit.

24. A device of the character described for delivering minute quantities of lubricating oil comprising in combination, a lubricant receptacle for containing a supply of lubricating oil, a reservoir above the oil level in said receptacle, a conduit in said receptacle extending below the oil level therein and having its respective extremities open to the atmosphere and to said reservoir and arranged to deliver oil to said reservoir, said conduit having an opening therein below the oil level to permit the entry of oil therein and means for causing an air current to flow through said conduit to elevate oil to said reservoir at a rate in excess of the demand, said reservoir having a delivery outlet and an overflow outlet slightly above said delivery outlet to maintain a low hydraulic head to cause a slow rate of feed from said delivery outlet, said overflow outlet being arranged for returning the overflow to said receptacle.

25. A device of the character described for delivering minute quantities of lubricating oil comprising in combination, a lubricant receptacle for containing a supply of lubricating oil, a reservoir above the oil level in said receptacle, a conduit in said receptacle extending below the oil level therein and having its respective extremities open to the atmosphere and to said reservoir and arranged to deliver oil to said reservoir, said conduit having an opening therein below the oil level to permit the entry of oil therein and means for causing an air current to flow through said conduit to elevate oil to said reservoir at a rate in excess of the demand, said reservoir having relatively adjustable delivery and overflow outlets to adjust the head of lubricant therein with respect to the delivery outlet so as to regulate the flow of lubricant from said delivery outlet, said overflow outlet being arranged for returning the overflow to said receptacle.

26. A device of the character described for delivering minute quantities of lubricating oil comprising in combination, a lubricant receptacle for containing a supply of lubricating oil, a reservoir above the oil level in said receptacle, a conduit in said receptacle extending below the oil level therein and having its respective extremities open to the atmosphere and to said reservoir and arranged to deliver oil to said reservoir, said conduit having an opening therein below the oil level to permit the entry of oil therein and means for causing an air current to flow through said conduit to elevate oil to said reservoir at a rate in excess of the demand, said reservoir having a delivery outlet and a vertically adjustable overflow device for maintaining a level in said reservoir slightly above said delivery outlet so as to induce a slow rate of lubricant discharge therefrom, said overflow device being arranged so that the overflow will return to said receptacle.

27. A device of the character described for delivering minute quantities of lubricating oil comprising in combination, a lubricant receptacle for holding a supply of lubricating oil, a reservoir for holding a body of lubricant separate from the lubricant in said receptacle, a conduit comprising a portion in communication with the atmosphere and extending below the oil level in said receptacle and another portion which extends to said reservoir, said conduit having an opening therein below the oil level in said receptacle by which oil may enter said conduit, and a suction outlet adapted to be connected with a source of suction and communicating with said receptacle and having a suction passage in communication with said reservoir for carrying away lubricant from said reservoir, said suction being adapted to induce a current of air in said conduit to carry oil to said reservoir, said reservoir having an overflow returning excess lubricant to said receptacle and maintaining an oil level independent of that in said receptacle, whereby the rate of delivery of oil from said reservoir is not affected by variations of oil level in said receptacle.

28. A lubricating device for internal combustion engines comprising in combination, a lubricant receptacle, a covering structure therefor having an air inlet and a suction outlet, the latter adapted to be connected with the engine suction, a lubricant conducting device carried by said structure and communicating at its respective ends with said inlet and outlet and arranged to extend into the lubricant, a body of fibrous air filtering material over said inlet, said conducting device provided with an oil entrance therein below normal oil levels whereby oil will be carried with the current of air in said tube created by the suction, said structure being provided with a reservoir arranged to receive the discharge of lubricant from said tube, and means associated with said reservoir for delivering lubricant into the current of air passing out of said suction inlet.

29. A lubricating device for internal combustion engines comprising in combination, a lubricant receptacle for holding a supply of lubricating oil, a reservoir for holding a body of lubricant separate from the lubricant in said receptacle, means for supplying lubricant from said receptacle to said reservoir, a suction outlet adapted to be connected to the engine suction and communicating with a suction conduit for carrying away lubricant from said reservoir, and means for increasing the rate of delivery of lubricant to said suction passage upon increased engine demand.

30. A device of the character described for delivering minute quantities of lubricating oil comprising in combination, a lubricant receptacle for holding a supply of lubricating oil, a reservoir for holding a body of lubricant separate from the lubricant in said receptacle, a conduit comprising a portion in communication with the atmosphere and extending below the oil level in said receptacle and another portion which extends to said reservoir, said conduit having an opening therein below the oil level in said receptacle by which oil may enter said conduit, a suction outlet adapted to be connected with a source of suction and communicating with said receptacle and having a suction passage in communication with said reservoir for carrying away lubricant from said reservoir, said suction being adapted to induce a current of air in said conduit to carry oil to said reservoir, said reservoir having an overflow returning excess lubricant to said receptacle and maintaining an oil level independent of that in said receptacle, whereby the rate of delivery of oil from said reservoir is not affected by variations of oil level in said receptacle, and means for increasing the delivery of lubricant to said suction passage upon decrease of engine suction.

31. A lubricating device for internal combustion engines comprising in combination, a lubricant receptacle for holding a supply of lubricating oil, a reservoir for holding a body of lubricant separate from the lubricant in said receptacle, means for supplying lubricant from said receptacle to said reservoir, a suction outlet adapted to be connected to the engine suction and communicating with a suction conduit for carrying away lubricant from said reservoir, and means associated with said reservoir for delivering lubricant at a slow rate to said suction conduit, said reservoir having an overflow returning excess lubricant to said receptacle and maintaining an oil level in said reservoir independent of that in said receptacle, whereby the rate of delivery of oil from said reservoir is not affected by variation of oil level in said receptacle.

32. A lubricating device for internal combustion engines comprising in combination, a lubricant receptacle, a covering structure therefor having an air inlet and a suction outlet, the latter adapted to be connected with the engine suction, a U-tube carried by said structure and communicating at its respective ends with said inlet and outlet and arranged to extend into the lubricant, said U-tube provided with an oil entrance therein below normal oil levels whereby oil will be carried with the current of air in said tube created by the suction, said structure being provided with a reservoir arranged to receive the discharge of lubricant from said tube, said reservoir being provided with an overflow for returning excess lubricant to the body of lubricant in said receptacle, venting means between said reservoir space and said receptacle to equalize pressures therein to avoid interference with the overflow return, and means associated with said reservoir for delivering lubricant into the current of air passing out of said suction outlet.

In testimony whereof, I have signed my name to this specification.

THOMAS VAN TUYL.